V. BENDIX.
ENGINE STARTER.
APPLICATION FILED DEC 16 1918.
1,345,576.
Patented July 6, 1920.
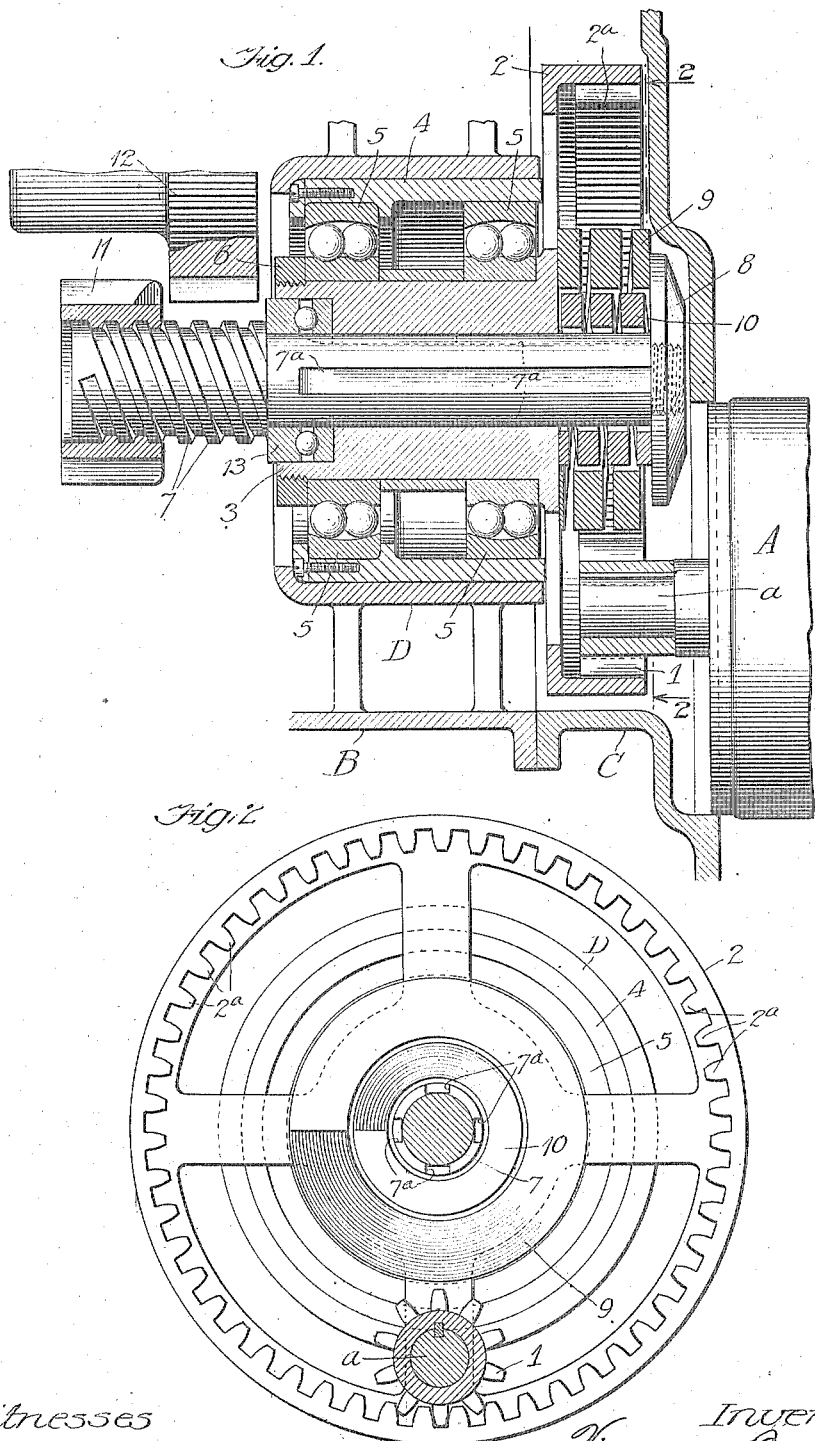
Witnesses
Martin H. Olsen.
Inventor
Vincent Bendix
By Rector, Hibben, Davis & Macauley
His Att'ys

UNITED STATES PATENT OFFICE.

VINCENT BENDIX, OF CHICAGO, ILLINOIS.

ENGINE-STARTER.

1,345,576.

Specification of Letters Patent.  Patented July 6, 1920.

Application filed December 16, 1918. Serial No. 267,068.

*To all whom it may concern:*

Be it known that I, VINCENT BENDIX, a citizen of the United States, residing at Chicago, Cook county, Illinois, have invented certain new and useful Improvements in Engine-Starters, of which the following is a specification.

My invention relates to engine starters and pertains more particularly to the production of a novel and efficient construction of the drive or transmission therefor. My drive belongs to that type characterized by the employment of a rotatable shaft such as a screw shaft and a driving member or pinion mounted thereon for automatic engagement with and disengagement from a member, such as the fly wheel, of the engine to be started. My invention consists in a novel construction and arrangement of the screw shaft and a driving gear which by preference is of the internal gear type. The various advantages and utility of construction and mode of operation will be apparent from the description hereinafter given.

In the drawing, Figure 1 is a section of an engine starter embodying my invention, and Fig. 2 a section on the line 2—2 of Fig. 1.

Referring to the particular embodiment herein shown, the starting motor indicated at A and the drive or transmission are suitably supported by the casings B and C, which may be separate casings or, as designed in the present instance, a part of the engine frame or case itself.

The armature shaft $a$ of the motor has secured thereto a driving pinion 1 which meshes with the teeth $2^a$ of an internal gear 2. This gear has an extended hub 3 which is supported by and adapted to rotate in a bearing shell 4 mounted in the casing B, sets of ball bearings 5 being preferably provided. This wheel and its hub is held in proper position against endwise movement by means of the collar 6 screwing onto the outer end of the hub.

The screw shaft 7 is mounted within the hub 3 for rotary movement therewith and longitudinal movement thereof by means of the splines $7^a$ and the corresponding grooves within the bore of the hub. This shaft extends through the hub and projects from either end thereof, the outer projecting ends being screw threaded and the remainder of its length being plain except for said splines. At its inner end the shaft has a projection or enlarged head 8 secured thereto in suitable manner as by being screw threaded thereto. Interposed between this head and the inner face of the hub or gear are concentric springs 9; 10, preferably two in number as shown, which tend to yieldingly hold the screw shaft in its normal position toward the right but which permit slight endwise movement to the left when occasion requires, as hereinafter explained.

The driving member is a pinion 11 which is screw threaded upon the screw threads of the shaft and is adapted to automatically move longitudinally into mesh with the fly wheel teeth 12. By preference a thrust ball bearing 13 is provided against which the pinion bears at the end of its inward movement when in mesh with the fly wheel.

Describing the operation of the starter and beginning with the parts in the normal position shown, the starting of operation of the motor rotates the pinion 1 and consequently the gear 2 and the screw shaft 7. As a result of this rotation of the shaft the pinion 11 is automatically advanced to the right into mesh with the fly wheel. When the pinion reaches the limit of this longitudinal movement and is stopped by the thrust bearing it will partake of the rotation of the screw shaft and will consequently rotate the fly wheel. When the engine has started on its own power the pinion will be automatically demeshed and returned to the normal position shown.

The foregoing description assumes that the pinion teeth and fly wheel teeth have registered for proper mesh in said meshing operation but it sometimes happens that these teeth meet end to end. In order to cushion this impingement and prevent jamming, the screw shaft is permitted the described longitudinal movement to the left when the pinion is momentarily stopped by its abutment against the fly wheel teeth. This movement of the shaft is a yielding one, the same being resisted by the springs 9 and 10. The pinion will now be slightly moved angularly into proper register and mesh with the fly wheel, whereupon the springs will restore the shaft to the normal position shown.

The described construction is a very solid and compact one for installations where reduction gearing is required and the employment of the internal gear contributes materially to compactness and moreover provides for the transmission of high degrees of torque. Moreover, the employment of an internal gear also provides for compactness by providing the space necessary for the springs which, as shown, are within the confines of this gear, and by enabling the bringing of the centers of the two shafts $a$ and 7 very close together, for installations in close quarters. Again, such internal gear gives quiet meshing and permits of the employment of a pinion with a rather narrow tooth face resulting in still more compactness. Furthermore, all of the parts of the drive are so combined that they constitute a unit, insertible in and withdrawable from the bearing support D after the motor and casing C are removed.

I claim:

1. In an engine starter, a drive or transmission comprising an internal gear, a rotatable shaft operatively connected therewith and in the rotarial axis thereof, a driving member mounted on one end thereof for longitudinal movement thereon to engage an engine member and for rotary movement therewith after such engagement, and a driving pinion meshing with the internal gear.

2. In an engine starter, a drive or transmission comprising an internal gear, a rotatable shaft operatively connected therewith and in the rotarial axis thereof, for rotary movement therewith and for longitudinal movement thereof, a driving member mounted on one end thereof for longitudinal movement thereon to engage an engine member and for rotary movement therewith after such engagement, and a driving pinion meshing with the internal gear.

3. In an engine starter, a drive or transmission comprising an internal gear, a rotatable shaft operatively connected therewith for rotary movement therewith and for longitudinal movement thereof, yielding means resisting such longitudinal movement, a driving member mounted on one end thereof for longitudinal movement thereon to engage an engine member and for rotary movement therewith after such engagement, and a driving pinion meshing with the internal gear.

4. In an engine starter, a drive or transmission comprising an internal gear, a rotatable shaft having screw threads at one end and operatively connected therewith, said shaft being in the rotarial axis of such gear, a pinion mounted on said screw threads for longitudinal movement thereon to engage an engine member and for rotary movement therewith after such engagement, and a driving pinion meshing with the internal gear.

5. In an engine starter, a drive or transmission comprising an internal gear, a rotatable shaft having screw threads at one end and operatively connected therewith, said shaft being in the rotarial axis of such gear, a pinion mounted on said screw threads for longitudinal movement thereon to engage an engine member and for rotary movement therewith after such engagement, and a bearing in which such internal gear is mounted, all of said elements being combined and insertible in and withdrawable from position as a unit.

6. In an engine starter, a drive comprising an internal gear, a rotatable shaft connected therewith for rotary movement therewith and longitudinal movement thereof, a spring at one end of said shaft to resist said longitudinal movement thereof, and a driving member mounted on the other end of the shaft for longitudinal movement thereof and rotary movement therewith.

7. In an engine starter, a drive comprising an internal gear, a rotatable shaft connected therewith for rotary movement therewith and longitudinal movement thereof, a spring at one end of said shaft to resist said longitudinal movement thereof, said shaft having screw threads at its other end portion, and a pinion screw-threaded on said screw threads and adapted to move longitudinally thereof and rotarily therewith.

8. In an engine starter, a drive comprising an internal gear, a rotatable shaft driven thereby and connected therewith for rotary movement therewith and longitudinal movement thereof, a spring located within the confines of said gear and connected with one end of the shaft projecting through the gear, and a driving member mounted on the other end of the shaft for longitudinal movement thereof and rotary movement therewith.

9. In an engine starter, a drive comprising a gear having an extended hub, a rotatable shaft extending through and supported by such hub and connected therewith for rotary movement therewith and longitudinal movement thereof, a spring at one end of the shaft to resist such longitudinal movement, and a driving member mounted on the other end of the shaft for longitudinal movement thereof and rotary movement therewith.

10. In an engine starter, a drive comprising a gear having an extended hub, a rotatable shaft extending through and supported by such hub and connected therewith for rotary movement therewith and longitudinal movement thereof, a projection at one end of such shaft, a spring interposed between the projection and the gear to resist said longitudinal movement, and a driving member mounted on the other end of the shaft for longitudinal movement thereof and rotary movement therewith.

11. In an engine starter, a drive comprising a gear having an extended hub, a rotatable shaft extending through the hub and splined thereto for rotary movement therewith and longitudinal movement thereof, a spring coöperating with the shaft at one end to resist said longitudinal movement, and a driving member mounted on the other end of the shaft for longitudinal movement thereof and rotary movement therewith.

VINCENT BENDIX.